(12) United States Patent
Murphy et al.

(10) Patent No.: US 6,695,608 B2
(45) Date of Patent: Feb. 24, 2004

(54) APPARATUS FOR MANUFACTURING A COMPOSITE GOLF CLUB HEAD

(75) Inventors: James M. Murphy, Oceanside, CA (US); Herbert Reyes, Laguna Niguel, CA (US); Robert S. Gonczi, Oceanside, CA (US); Donald A. Bistline, Vista, CA (US); Andrew J. Goodjohn, Vista, CA (US); James C. Wenck, Carlsbad, CA (US); James A. Nycum, San Marcos, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/683,665

(22) Filed: Jan. 31, 2002

(65) Prior Publication Data

US 2002/0113338 A1 Aug. 22, 2002

Related U.S. Application Data

(63) Continuation-in-part of application No. 09/877,652, filed on Jun. 8, 2001, now Pat. No. 6,440,008, which is a continuation of application No. 09/474,670, filed on Dec. 29, 1999, now Pat. No. 6,248,025, which is a continuation-in-part of application No. 08/958,723, filed on Oct. 23, 1997, now Pat. No. 6,010,411.

(51) Int. Cl.[7] .............................................. B29C 43/36
(52) U.S. Cl. ........................ 425/398; 425/412; 264/325
(58) Field of Search ................................. 425/383, 394, 425/414, 398, 412, DIG. 44; 264/319, 320, 325

(56) References Cited

U.S. PATENT DOCUMENTS

| 1,658,581 A |   | 2/1928 | Tobia |        |
|-------------|---|--------|-------|--------|
| 4,469,655 A | * | 9/1984 | Kiss  | 264/82 |
| 4,496,153 A |   | 1/1985 | Kochevar |    |
| 4,502,687 A |   | 3/1985 | Kochevar |    |
| 4,575,447 A |   | 3/1986 | Hariguchi |   |

(List continued on next page.)

FOREIGN PATENT DOCUMENTS

GB          2 292 332 A         4/1994

*Primary Examiner*—Edmund H. Lee
(74) *Attorney, Agent, or Firm*—Michael A. Catania; Elaine H. La

(57) ABSTRACT

A method and apparatus for manufacturing a preform component for a golf club head composed of a plurality of plies of pre-preg material is disclosed herein. The preform component is preferably a face component, a crown component or a sole component, composed of a plurality of plies of pre-preg material. The apparatus preferably has a plunger head attached to a pneumatic cylinder for compressing the plies of pre-preg sheets within a mold cavity configured to define a preform component.

4 Claims, 16 Drawing Sheets

U.S. PATENT DOCUMENTS

| | | |
|---|---|---|
| 4,667,963 A | 5/1987 | Yoneyama |
| 4,778,722 A | 10/1988 | Yamamura et al. |
| 4,779,387 A * | 10/1988 | Reid et al. .................... 451/9 |
| 4,793,616 A | 12/1988 | Fernandez |
| 4,874,171 A | 10/1989 | Ezaki et al. |
| 5,009,425 A | 4/1991 | Okumoto et al. |
| 5,190,290 A | 3/1993 | Take |
| 5,213,329 A | 5/1993 | Okumoto |
| 5,228,964 A | 7/1993 | Okumoto |
| 5,242,168 A | 9/1993 | Aizawa |
| 5,262,118 A | 11/1993 | Fukushima et al. |
| 5,318,296 A | 6/1994 | Adams et al. |
| 5,350,556 A * | 9/1994 | Abe et al. ................... 264/248 |
| 5,377,986 A | 1/1995 | Viollaz et al. |
| 5,378,295 A * | 1/1995 | Yamashita et al. .......... 148/654 |
| 5,429,365 A | 7/1995 | McKeighon |
| 5,485,998 A | 1/1996 | Kobayashi |
| 5,489,098 A | 2/1996 | Gojny et al. |
| 5,533,728 A | 7/1996 | Pehoski |
| 5,547,427 A | 8/1996 | Rigal et al. |
| 5,593,356 A | 1/1997 | Takeda |
| 5,672,120 A | 9/1997 | Ramirez |
| 5,674,133 A | 10/1997 | Chang |
| 5,779,560 A | 7/1998 | Buck |
| 5,985,197 A | 11/1999 | Nelson |
| 5,989,134 A | 11/1999 | Antonious |
| 6,165,081 A | 12/2000 | Chou |

* cited by examiner

APPARATUS FOR MANUFACTURING A COMPOSITE GOLF CLUB HEAD

CROSS REFERENCE TO RELATED APPLICATIONS

This application is a continuation-in-part application of U.S. patent application Ser. No. 09/877,652, filed on Jun. 8, 2001, now U.S. Pat. No. 6,440,008, which is a continuation of U.S. patent application Ser. No. 09/474,670, filed on Dec. 29, 1999, now U.S. Pat. No. 6,248,025, which is continuation-in-part application of U.S. patent application Ser. No. 08/958,723, filed on Oct. 23, 1997, now U.S. Pat. No. 6,010,411.

FEDERAL RESEARCH STATEMENT

[Not Applicable]

BACKGROUND OF INVENTION

1. Field of the Invention

The present invention relates to a manufacturing method for a golf club head composed of plies of pre-preg sheets. More specifically, the present invention relates to a bladder-mold manufacturing method for a golf club head composed of plies of pre-preg sheets.

2. Description of the Related Art

One of the first (if not the first) disclosures of a golf club head composed of a plurality of plies of a pre-preg material is Great Britain Patent Application Number 1201648 which was filed in 1967 on behalf of William Charles Carlton.

In 1984, U.S. Pat. No. 4,449,707 issued to Hayashi et al., for a Golf Club Head Of Carbon Fiber Reinforced Plastic, based on a Japanese Patent Application originally filed in 1982. The Hayashi Patent discloses surrounding a core with a fiber reinforced fabric to create a golf club head with a proper center of gravity.

Another disclosure is U.S. Pat. No. 4,545,580 to Tomita et al., for a Wood-Type Golf Club Head, based on a Japanese Patent Application originally filed in 1983. The Tomita Patent discloses a durable golf club head having an outer shell composed of a fiber reinforced plastic material, a foam center core, and an intermediate shell formed of a thermoplastic resin material.

Yet another disclosure is U.S. Pat. No. 4,630,826 to Nishigaki et al., for Golf Club Head. The Nishigaki Patent discloses body composed of a carbon resin layer and a cast resin layer with a face insert block composed of a ceramic material.

Still another disclosure is U.S. Pat. No. 4,778,185 to Kurokawa, for Wood-Type Core-Shell Golf Club Heads, based on a Japanese Patent Application originally filed in 1984. The Kurokawa Patent discloses a golf club head composed of a foam core and a shell composed of a material fiber reinforced plastic having long and short fibers.

Yet another disclosure is U.S. Pat. No. 4,793,616 to Fernandez, for Golf Club. The Fernandez Patent discloses a club head shell composed resin impregnated fibers and ceramic particles within the resin to provide a high strength shell.

Yet another disclosure is U.S. Pat. No. 5,154,425 to Niskanen et al., for a Composite Golf Club Head. The Niskanen Patent discloses a club head composed of a metal matrix composite of a ceramic matrix composite.

When a golf club head strikes a golf ball, large impacts are produced that load the club head face and the golf ball. Most of the energy is transferred from the head to the golf ball, however, some energy is lost as a result of the collision. The golf ball is typically composed of polymer cover materials (such as ionomers) surrounding a rubber-like core. These softer polymer materials having damping (loss) properties that are strain and strain rate dependent which are on the order of 10–100 times larger than the damping properties of a metallic club striking plate. Thus, during impact most of the energy is lost as a result of the high stresses and deformations of the golf ball (0.001 to 0.20 inches), as opposed to the small deformations of the metallic club face (0.025 to 0.050 inches). A more efficient energy transfer from the club head to the golf ball could lead to greater flight distances of the golf ball.

The generally accepted approach has been to increase the stiffness of the club head face to reduce metal or club head deformations. However, this leads to greater deformations in the golf ball, and thus increases in the energy transfer problem.

Some have recognized the problem and disclosed possible solutions. An example is Campau, U.S. Pat. No. 4,398,965, for a Method Of Making Iron Golf Clubs With Flexible Impact Surface, which discloses a club having a flexible and resilient face plate with a slot to allow for the flexing of the face plate. The face plate of Campau is composed of a ferrous material, such as stainless steel, and has a thickness in the range of 0.1 inches to 0.125 inches.

Another example is Eggiman, U.S. Pat. No. 5,863,261, for a Golf Club Head With Elastically Deforming Face And Back Plates, which discloses the use of a plurality of plates that act in concert to create a spring-like effect on a golf ball during impact. A fluid is disposed between at least two of the plates to act as a viscous coupler.

Yet another example is Jepson et al, U.S. Pat. No. 3,937,474, for a Golf Club With A Polyurethane Insert. Jepson discloses that the polyurethane insert has a hardness between 40 and 75 shore D.

Still another example is Inamori, U.S. Pat. No. 3,975,023, for a Golf Club Head With Ceramic Face Plate, which discloses using a face plate composed of a ceramic material having a high energy transfer coefficient, although ceramics are usually harder materials. Chen et al., U.S. Pat. No. 5,743,813 for a Golf Club Head, discloses using multiple layers in the face to absorb the shock of the golf ball. One of the materials is a non-metal material.

Lu, U.S. Pat. No. 5,499,814, for a Hollow Club Head With Deflecting Insert Face Plate, discloses a reinforcing element composed of a plastic or aluminum alloy that allows for minor deflecting of the face plate which has a thickness ranging from 0.01 to 0.30 inches for a variety of materials including stainless steel, titanium, KEVLAR®, and the like. Yet another Campau invention, U.S. Pat. No. 3,989,248, for a Golf Club Having Insert Capable Of Elastic Flexing, discloses a wood club composed of wood with a metal insert.

The Rules of Golf, established and interpreted by the United States Golf Association (USGA) and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club face, Rule 4-1e prohibits the face from having the effect at impact of a spring with a golf ball. In 1998, the USGA adopted a test procedure pursuant to Rule 4-1e which measures club face COR. This USGA test procedure, as well as procedures like it, may be used to measure club face COR.

Although the prior art has disclosed many club head composed of composite materials, the prior art has failed to provide a golf club head composed of a composite material that is lightweight, forgiving and has a high coefficient of restitution.

SUMMARY OF INVENTION

The present invention provides a method for manufacturing a golf club head that is composed of a composite material and is forgiving while providing better performance than other composite golf club heads.

One aspect of the present invention is a method for producing a golf club head composed of plies of pre-preg sheets. The method begins by creating a face component composed of plies of pre-preg sheets. A crown component composed of plies of pre-preg sheets is created next and then a sole component composed of plies of pre-preg sheets is created using the method. The face, crown and sole components are then assembled to create an assembled unit with an inflatable bladder located within a hollow interior of the assembled unit. The assembled unit is then pre-compacted to create a pre-compacted unit. Finally, the pre-compacted unit is bladder molded to create a molded golf club head.

Having briefly described the present invention, the above and further objects, features and advantages thereof will be recognized by those skilled in the pertinent art from the following detailed description of the invention when taken in conjunction with the accompanying drawings.

DETAILED DESCRIPTION

Figure 1:
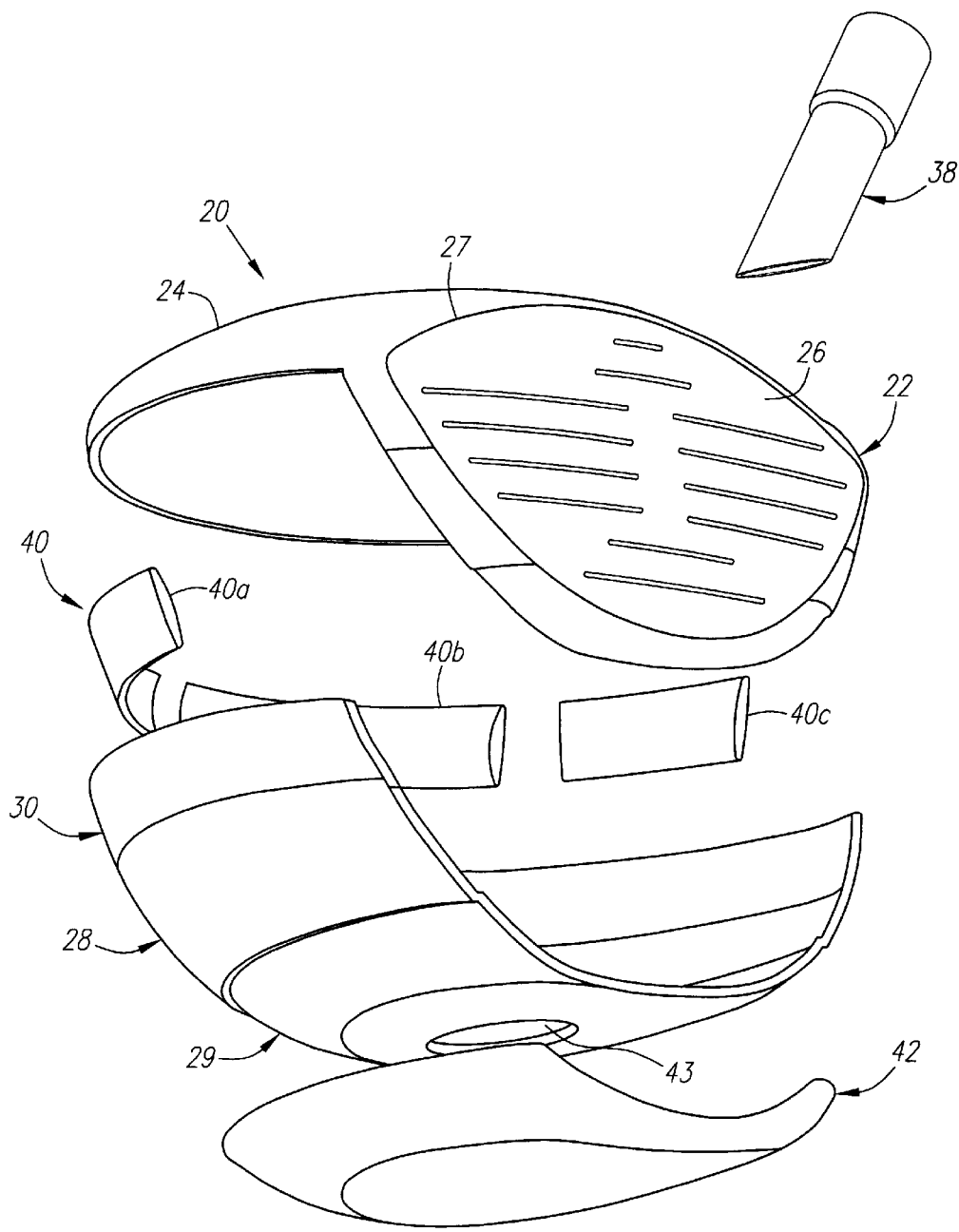
FIG. 1 is an exploded view of a golf club head manufactured by the method of the present invention.

The present invention is directed at an apparatus and method for manufacturing a preform component composed of plies of pre-preg sheets for a golf club head. The preform component is a crown component, a sole component, and/or a face component. The golf club head is preferably composed of a plurality of plies of pre-preg sheets. Alternatively, portions of the golf club head are composed of metals or injected molded polymers.

As shown in FIGS. 1–6, a golf club head is generally designated 20. The club head 20 is either a fairway wood or a driver. The drivers range in loft angle of from six degrees to fifteen degrees. The club head 20 has a body 22 that is generally composed of a composite material such as plies of carbon pre-preg sheets, however, portions may be composed of metal or injected molded polymers. The body 22 has a crown 24, a striking plate 26, a sole 28 with a bottom portion 28a and a ribbon 30. The ribbon preferably has an upper ribbon wall 30a and a lower ribbon wall 30b. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is an internal tube 38 with an opening 39 for placement of a shaft therein. The internal tube 38 is placed within the hollow interior 44 of the body 22. A weight member 40 is preferably located within the ribbon 30.

A sole plate 42 is disposed within a recess 29 of the bottom portion 28a of the sole 28. The sole plate 42 is preferably composed of a metal material such as aluminum or titanium, and preferably has a mass of 5 grams to 20 grams. A preferred mass for an aluminum sole plate 42 is approximately 11 grams, and a preferred mass for a titanium sole plate 42 is approximately 18 grams. The sole plate 42 is preferably bonded within the recess 29 through the use of adhesives. The sole plate 42 preferably has embossed graphics thereon. The sole plate 42 increases the durability of the club head 20 since the sole 28 often impacts the ground during the striking of a golf ball.

The club head 20 also has a greater volume than a composite club head of the prior art while maintaining a weight that is substantially lower or equivalent to that of the prior art. The volume of the club head 20 ranges from 175 cubic centimeters to 450 cubic centimeters, more preferably ranges from 300 cubic centimeters to 400 cubic centimeters, and is most preferably 360 cubic centimeters for a driver. The mass of the club head 20 ranges from 165 grams to 300 grams, preferably ranges from 175 grams to 225 grams, and most preferably from 188 grams to 195 grams. The body 22 of plies of pre-preg material has a mass ranging from 80 grams to 120 grams, and most preferably 98 grams.

The volume of the golf club head 20 is increased by increasing the vertical distance of the club head 20 from the sole 28 to the crown 24, as opposed to the horizontal distance of the heel end 34 to the toe end 32. This increase in volume is brought about by the dual wall structure of the ribbon 30. The upper ribbon wall 30a is approximately perpendicular relative to the crown 24, while the lower ribbon wall 30b preferably has an angle between 25 degrees and 75 degrees relative to the crown 24. The greater volume of the club head 20 allows the club head 20 to be more forgiving than prior art golf club heads while providing better performance. The mass of club head 20 is much lower than metal club heads of similar volumes, and thus the large volume does not deter from the swing of a golfer.

Figure 2:
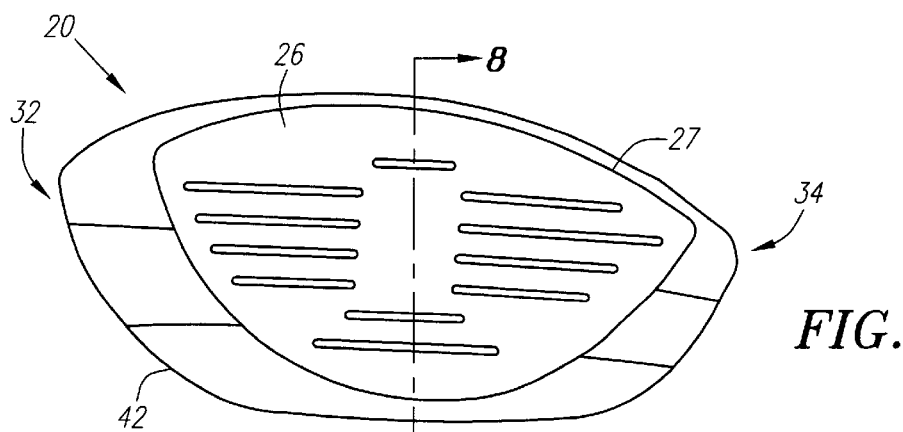
FIG. 2 is a front view of a golf club head manufactured by the method of the present invention.
Figure 2A:
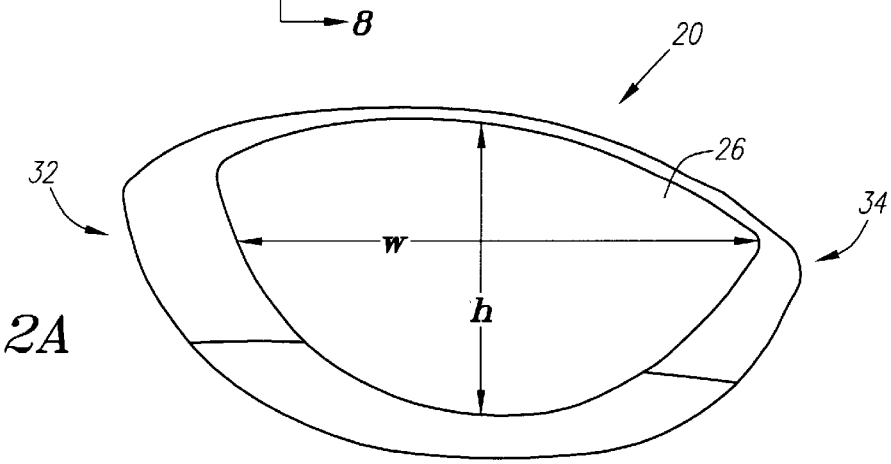
FIG. 2A is a front view of a golf club head manufactured by the method of the present invention.
Figure 3:
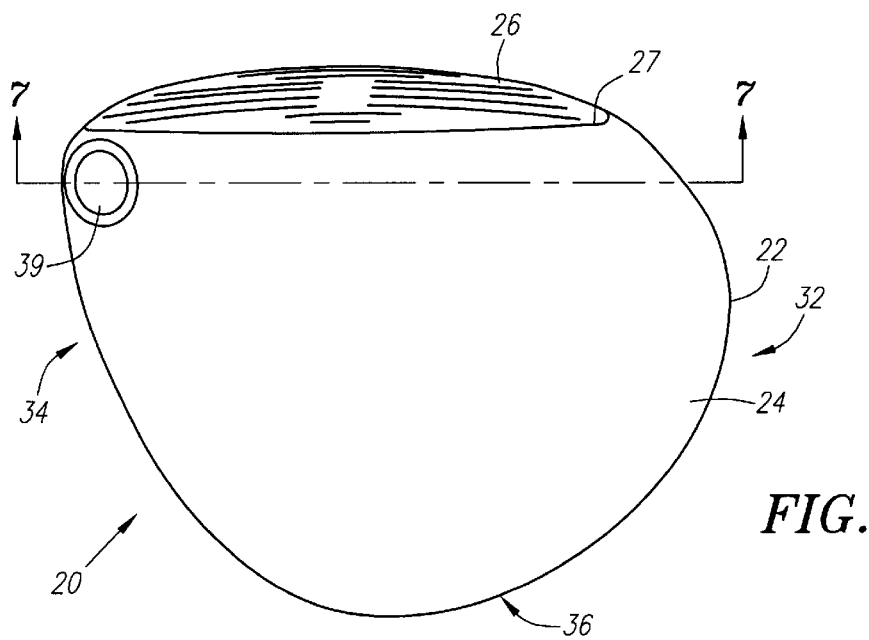
FIG. 3 is a top plan view of a golf club head manufactured by the method of the present invention.
Figure 4:
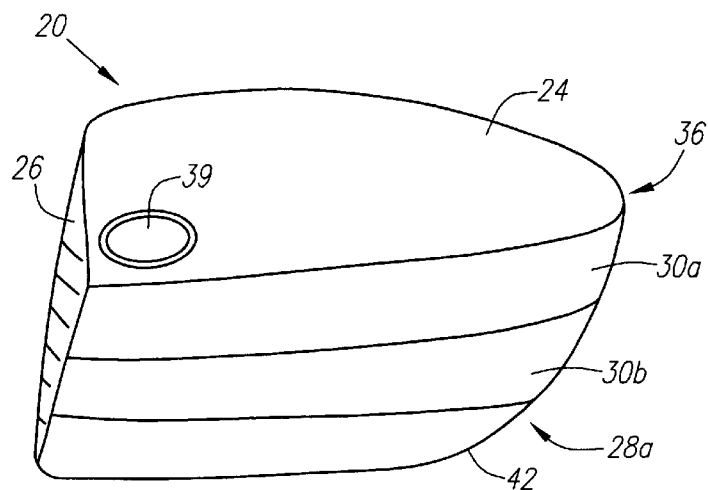
FIG. 4 is a heel end view of a golf club head manufactured by the method of the present invention.
Figure 5:
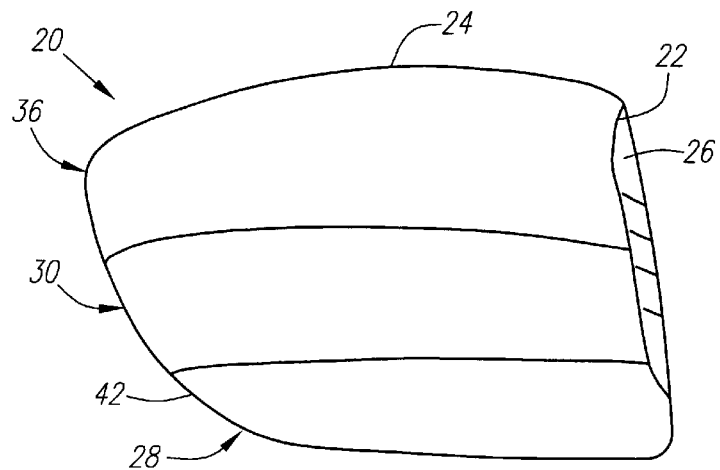
FIG. 5 is a toe end view of a golf club head manufactured by the method of the present invention.
Figure 6:
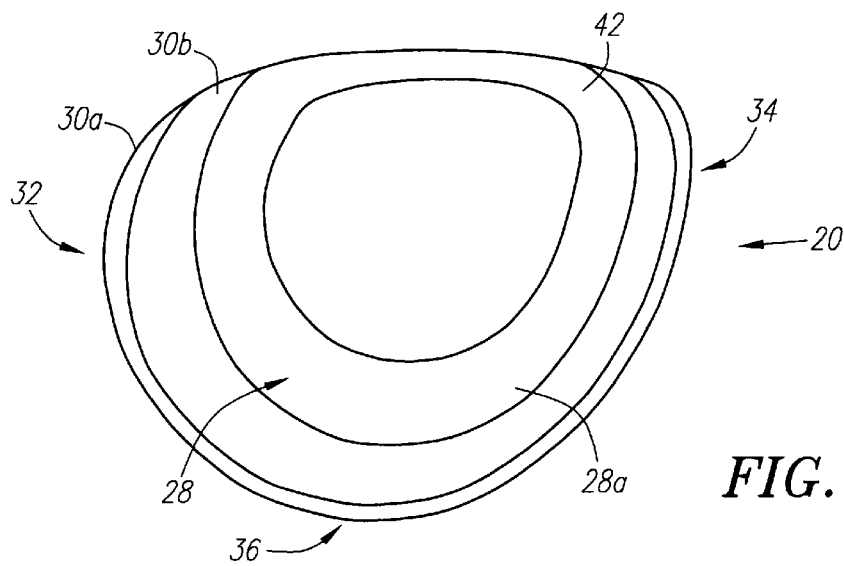
FIG. 6 is a bottom plan view of a golf club head manufactured by the method of the present invention.

The striking plate 26 has a smaller aspect ratio than striking plates of the prior art. The aspect ratio as used herein is defined as the width, w, of the striking plate divided by the height, h, of the striking plate 26, as shown in FIG. 2A. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver had an aspect ratio of 1.9. The aspect ratio of the present invention preferably ranges from 1.0 to 1.7.

Figure 7:
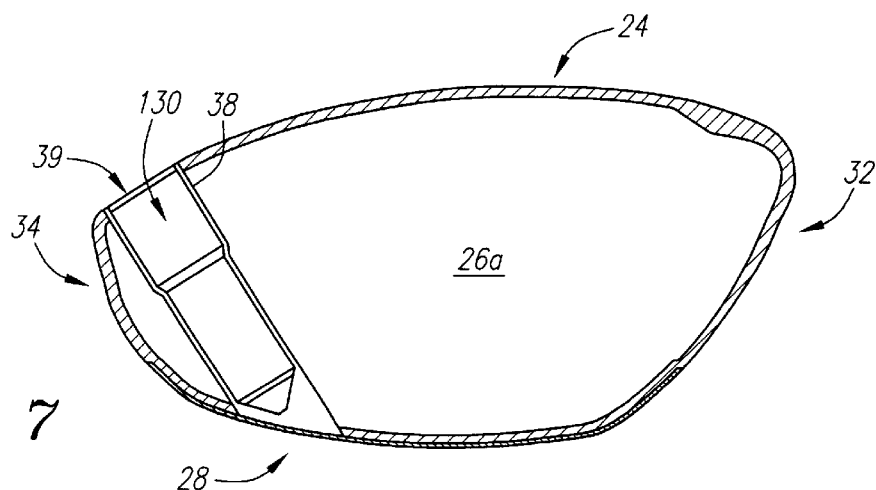
FIG. 7 is a cross-sectional view of the golf club head of FIG. 3 along line 7—7.
Figure 8:
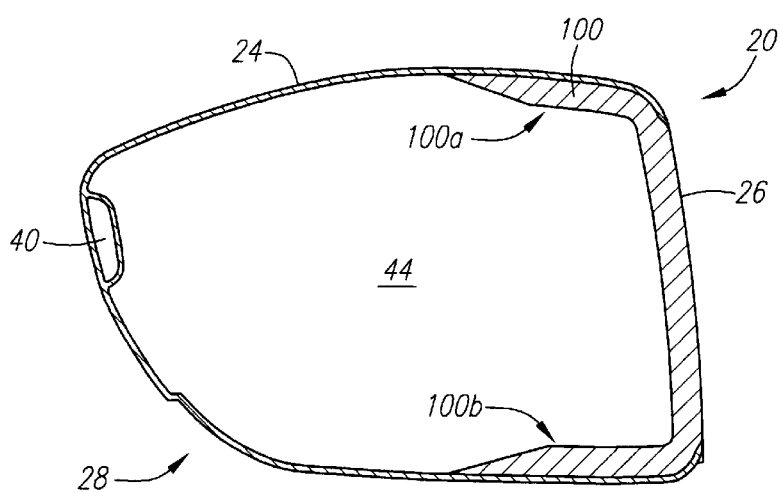
FIG. 8 is a cross-sectional view of the golf club head of FIG. 2 along line 8—8.
Figure 9:
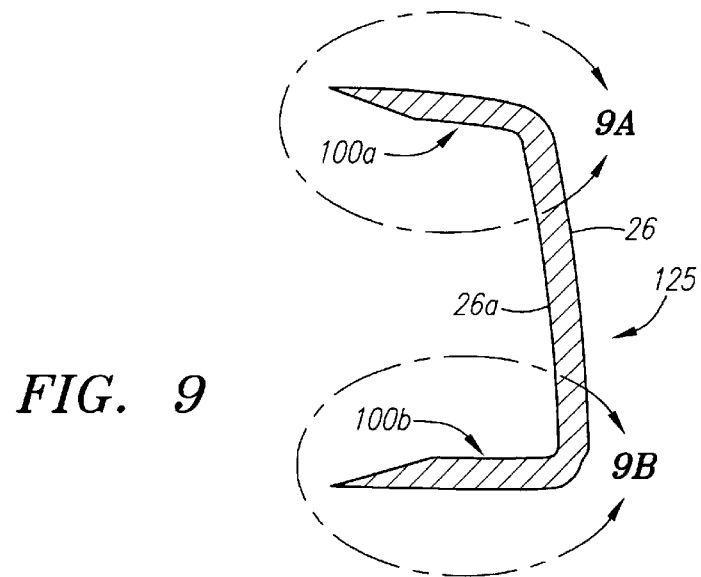
FIG. 9 is an isolated cross-section view of a face preform of the present invention.
Figure 9A:
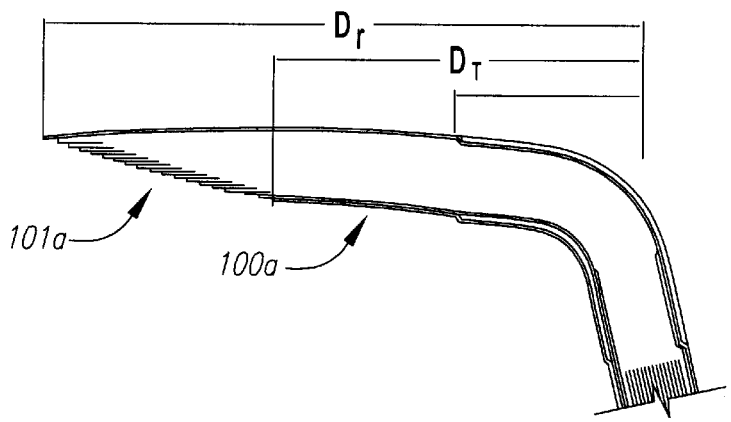
FIG. 9A is an enlarged view of area A of FIG. 9.
Figure 9B:
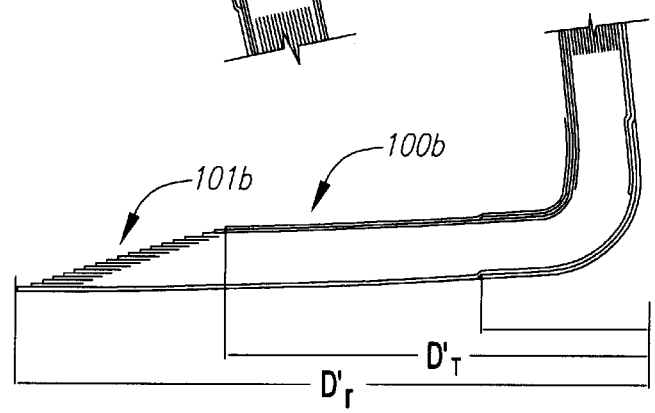
FIG. 9B is an enlarged view of area B of FIG. 9.

As shown in FIG. 7, the internal tube 38 lies within the hollow interior 44 of the club head 20. The internal tube is preferably composed of a metal material and has a mass ranging from 8 grams to 20 grams. The internal tube 38 is most preferably composed of stainless steel and has a mass of approximately 14 grams. The internal tubing 38 has a bore 130 to receive an insert and a shaft, not shown, therein. Such an insert is discussed in U.S. Pat. No. 6,352,482, filed on Aug. 31, 2000, for a Golf Club With Hosel Liner, which is hereby incorporated by reference in its entirety. Preferably, the club head 20 has a hollow interior 44 defined by the body 22, however, the light weight of the composite body 22 allows for numerous manipulations in placement of weight, foam, sound enhancing devices and the like within the hollow interior 44.

Referring specifically to FIG. 1, the club head 20 has a weight member 40 disposed within the plies of pre-preg that compose the ribbon 30 of the club head 20. Preferably, the weight member 40 is composed of three weight members 40a, 40b and 40c. One such weight member 40 is described in U.S. Pat. No. 6,386,990, flied on Dec. 29, 1999, and entitled A Composite Golf Club Head With An Integral Weight Strip, which is hereby incorporated by reference in its entirety. The weight member 40 is preferably composed of a polymer material integrated with a metal material. The metal material is preferably selected from copper, tungsten, steel, aluminum, tin, silver, gold, platinum, or the like. A preferred metal is tungsten. The weight member 40 has a density greater than the composite material of the body 22. Preferably, the weight member 40 extends from approximately the heel end 34 of the striking plate 26 through the rear 36 to the toe end 32 of the striking plate 26. However, the weight member 40 may only extend along the rear 36 of the ribbon 30, the heel end 34 of the ribbon 30, the toe end 32 of the ribbon 30, or any combination thereof. Those skilled in the pertinent art will recognize that other weighting materials may be utilized without departing from the scope and spirit of the present invention.

The placement of the weighting members 40a–c allows for the moment of inertia of the golf club head 20 to be optimized. A more thorough description of the optimization of the moments of inertia is disclosed in co-pending U.S. patent application Ser. No. 09/796,951, filed on Feb. 27, 2001, entitled High Moment of Inertia Composite Golf Club, and hereby incorporated by reference in its entirety. In one preferred example of the golf club head 20 of the present invention, the moment of inertia about the lxx axis through the center of gravity is approximately 2566 grams-centimeters squared (g-cm$^2$), the moment of inertia about the Iyy axis through the center of gravity is approximately 1895 g-cm$^2$, and the moment of inertia about the lzz axis through the center of gravity is approximately 3368 g-cm$^2$.

As shown in FIGS. 8, 9, 9A and 9B, a return portion 100 is a transition area from a perimeter 29 of the striking plate 26 rearward towards the crown 24. The return portion 100 has a thickness ranging from 0.100 inch to 0.200 inch to control the compliance of the striking plate 26. The return portion 100 has an upper section 100a, a lower section 100b, a heel section 100c, not shown, and a toe section 100d, not shown. The return portion 100 also has a taper region 101, which includes an upper tapering region 101a, a lower tapering region 101b, a heel tapering region 101c, not shown, and a toe tapering region 101d, not shown. The tapering region 101 tapers in thickness from a greater thickness nearer the striking plate portion 26 to a lesser thickness rearward toward the crown 24.

The return portion 100 has a predetermined length which extends rearward from the perimeter 29 of the striking plate portion 26 into the crown 24. Preferably, the distance of the return portion 100, Dr, ranges from 0.25 inch to 2.0 inches, more preferably from 0.5 inch to 1.75 inches, and most preferably 1.5 inches. Preferably, the distance from the perimeter 29 to the beginning of the tapering region 101 of the return portion 100 ranges from 0.25 inch to 1.5 inches, and most preferably 1.0 inch.

Figure 10:
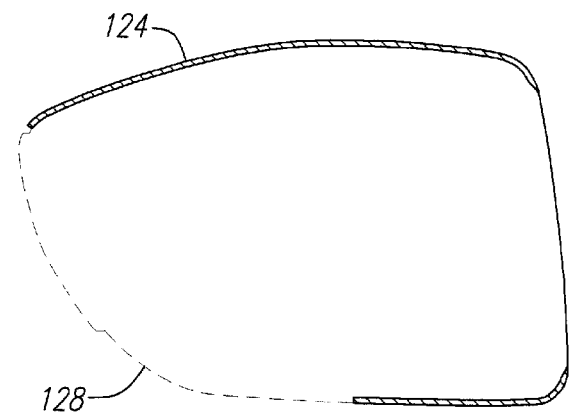
FIG. 10 is an isolated cross-section view of a crown/face preform of a golf club head of the present invention.
Figure 11:
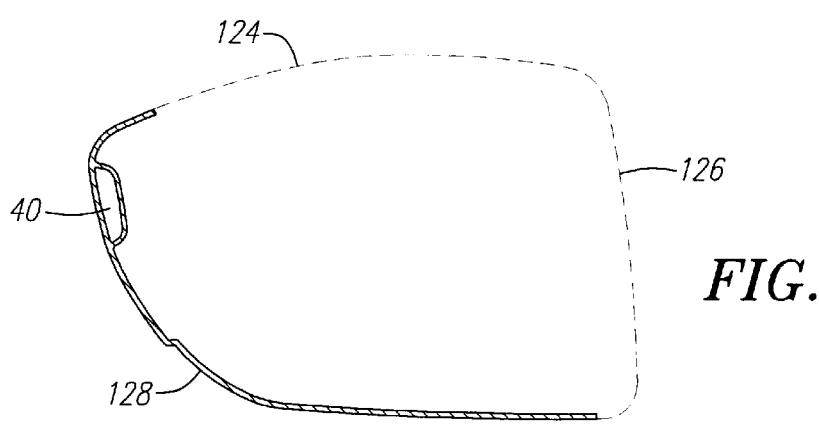
FIG. 11 is an isolated cross-section view of a sole preform of the present invention.
Figure 12:
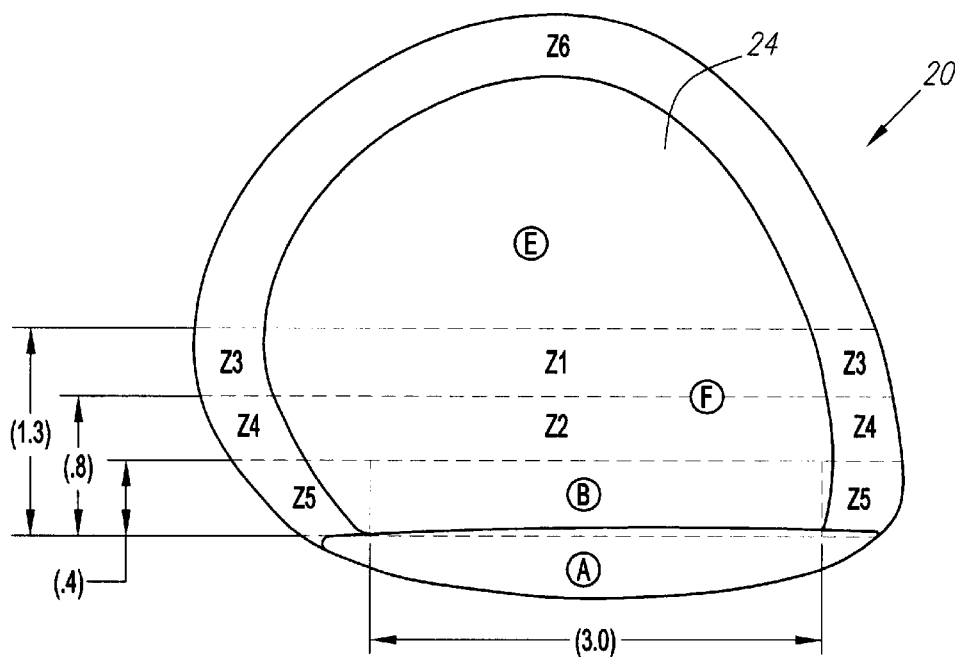
FIG. 12 is a top plan view of a golf club head manufactured by the method of the present invention illustrating the variation in thickness of the walls of the golf club head.
Figure 13:
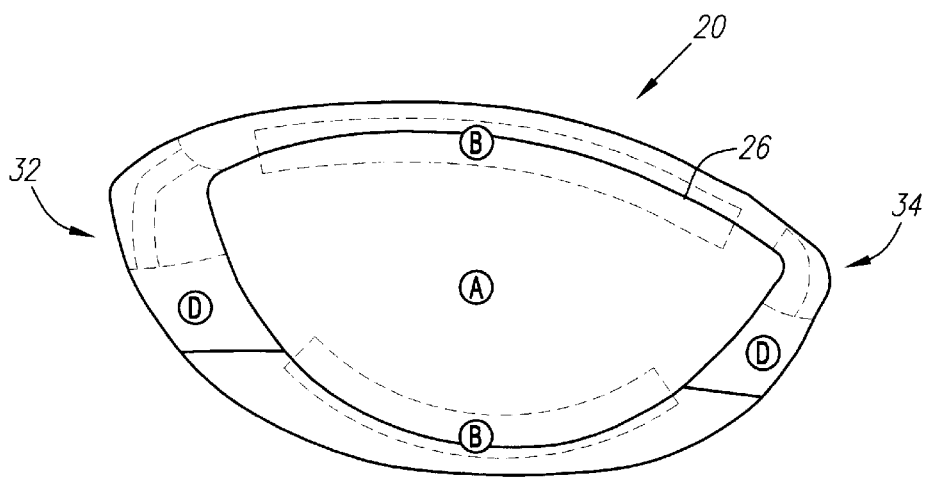
FIG. 13 is a front plan view of a golf club head manufactured by the method of the present invention illustrating the variation in thickness of the walls of the golf club head.
Figure 14:
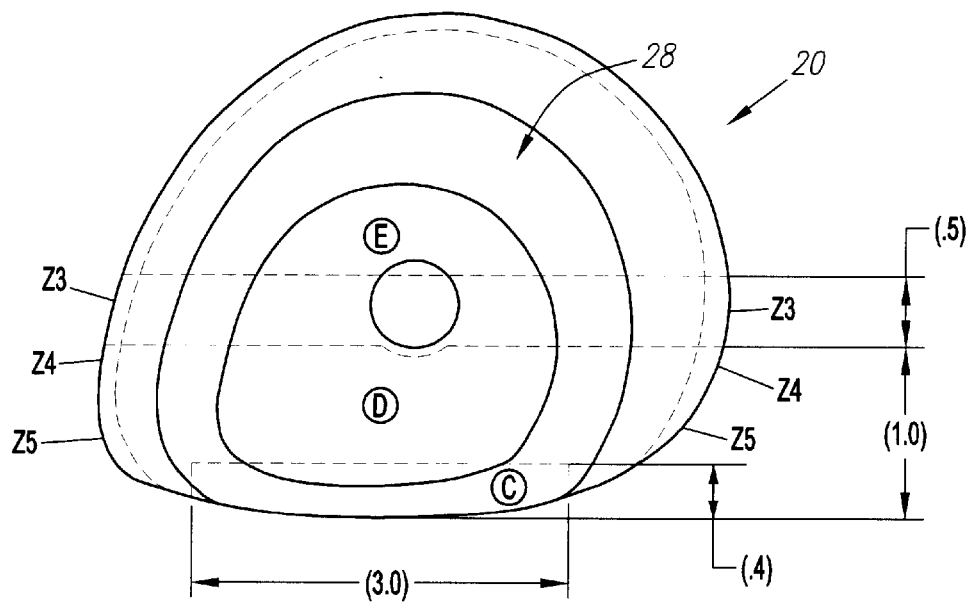
FIG. 14 is a bottom plan view of a golf club head manufactured by the method of the present invention illustrating the variation in thickness of the walls of the golf club head.
Figure 15:
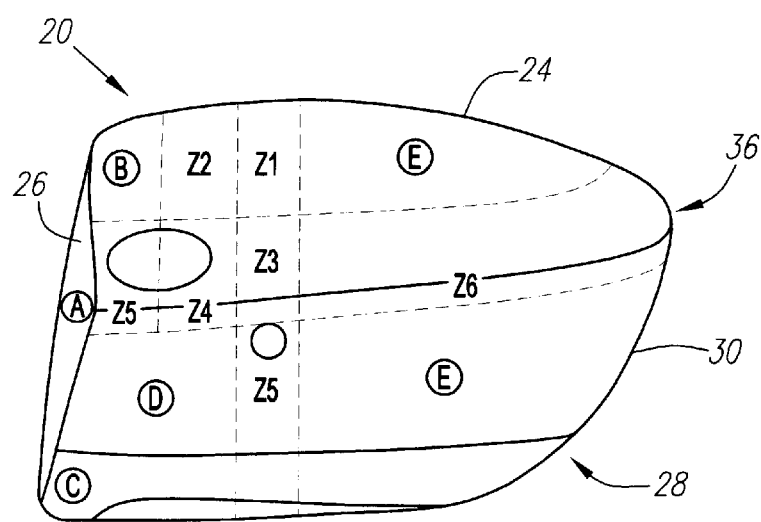
FIG. 15 is a heel end view of a golf club head manufactured by the method of the present invention illustrating the variation in thickness of the walls of the golf club head.

The body 22 is manufactured from a face component 125, which includes the striking plate portion 26 and the return portion 100, a crown component 124 and a sole component 128. The crown component 124 overlaps the face component 125, as shown in FIG. 10. The sole component 128 includes the ribbon portion 30 and the bottom portion 28a. The sole component 128 is attached to the crown component 124 and the face component 125.

Figure 16:
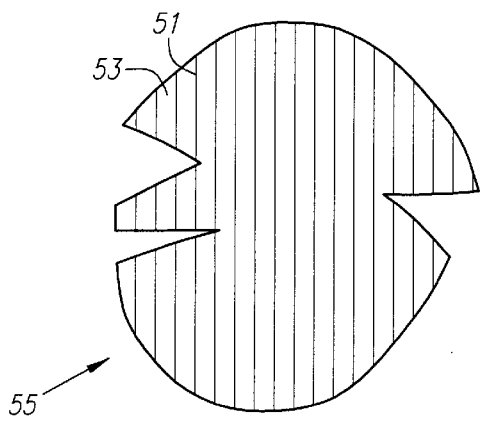
FIG. 16 is a plan view of a face/crown ply having a ninety degree orientation.

FIGS. 16–19 illustrate preferred pre-preg sheets for forming the composite body of the golf club head 20. FIG. 16 illustrates a face/crown ply pre-preg sheet that is generally designated 55. The face/crown ply 55 has a plurality of fibers 51 dispersed within a resin body 53. The fibers 51 are preferably composed of a carbon material. Alternatively, the fibers 51 may be aramid fibers, glass fibers or the like. The resin is typically an epoxy material. The relation of the fibers 51 to the striking plate 26, when the striking plate 26 is in a position to strike a golf ball, determines the orientation of the fibers 51. If the fibers 51 are parallel with the ground, or in other words extending across from the toe end to the heel end, then the face/crown ply 55 has a zero degree orientation. If the fibers 51 are approximately perpendicular to the ground, as shown in FIG. 16, or in other words extending from the crown to the sole, then the face/crown ply 55 has a ninety degrees orientation.

Figure 17:
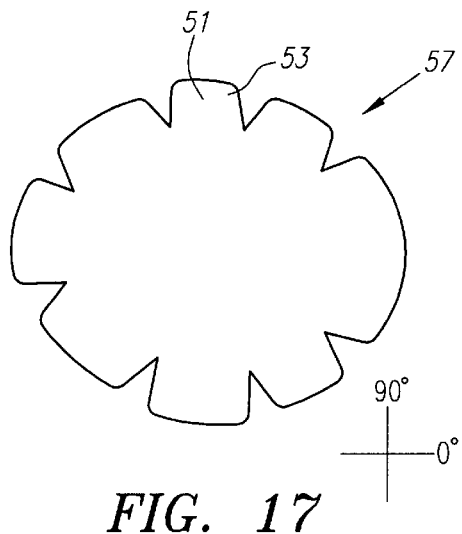
FIG. 17 is a plan view of a full face ply having a ninety degree orientation.

FIG. 17 illustrates a full face ply pre-preg sheet that is generally designated 57. As with the face/crown ply 55, the full face ply 57 has a plurality of fibers 51 dispersed within a resin body 53. The fibers 51 extend from the sole 28 to the crown 24, and thus the full face ply 57 has fibers 51 that are perpendicular to the ground when it is in a position for striking a golf ball. Therefore, the full face ply 57 of FIG. 17 has a ninety degrees orientation.

Figure 18:
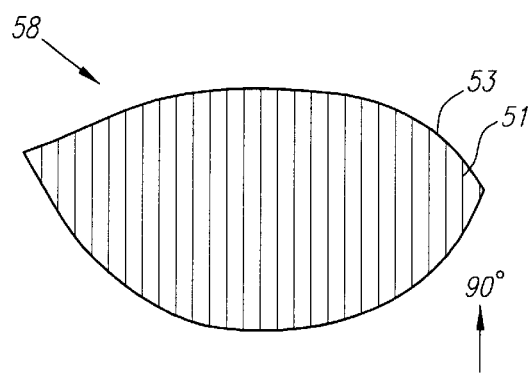
FIG. 18 is a plan view of a face doubler ply having a ninety degree orientation.

FIG. 18 illustrates a face doubler ply pre-preg sheet that is generally designated 58. As with the face/crown ply 55, the face doubler ply 58 has a plurality of fibers 51 dispersed within a resin body 53. The fibers 51 extend from the sole 28 to the crown 24, and thus the face doubler ply 58 has fibers 51 that are perpendicular to the ground when it is in a position for striking a golf ball. Therefore, the face doubler ply 58 of FIG. 18 has a ninety degrees orientation.

Figure 19:
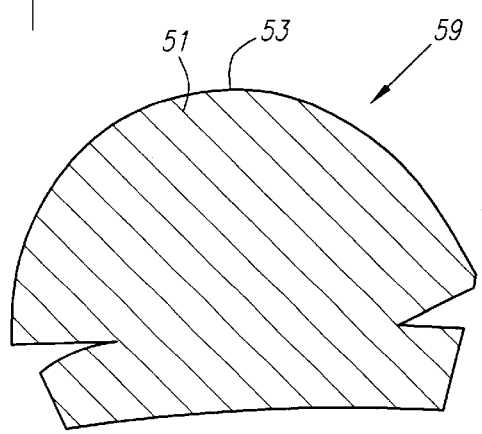
FIG. 19 is a plan view of a sole ply having a negative forty-five degree orientation.

FIG. 19 illustrates a sole ply pre-preg sheet that is generally designated 59. As with the face/crown ply 55, the sole ply 59 has a plurality of fibers 51 dispersed within a resin body 53. The fibers 51 extend at a forty-five degree angle relative to the ground when it is in a position for striking a golf ball. Therefore, the sole ply 59 of FIG. 19 has a forty-five degree orientation.

As previously stated, the preferred composite material is plies of carbon pre-peg sheets. Plies of pre-preg composite sheets are manufacby pulling strands of fiber in a parallel motion, preferably carbon, aramid or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and ninety degrees. Exemplary carbon pre-preg fiber sheets may be obtained from Newport Composites of Santa Ana, Calif., Fiberite Inc. of GreenTexas, or Hexcel Inc. of Pleasonton, Calif.

The manipulation of the thickness of the various regions of the body 22 allows the golf club head 20 to have superior durability, forgiveness and performance as compared to prior art composite golf club heads. As shown in FIGS. 12–15, the thickness of the body 22 is focused on the striking plate portion 26. In a most preferred example: the region designated A of the striking plate portion 26 has a thickness of approximately 0.169 inch; the region designated B, at the junction of the crown 24 and striking plate 26 has a thickness of approximately 0.188 inch; the region designated C of the bottom portion 28a of the sole 28 has a thickness of approximately 0.221 inch; the region designated D of the ribbon 30 and of the bottom portion 28a has a thickness of approximately 0.202 inch; the region designated E of the crown 24, the bottom portion 28a and the ribbon 30 has a thickness of approximately 0.033 inch; and the region designated F of the crown 24 has a thickness of approximately 0.191 inch. The regions designated Z1, Z2, Z3, Z4, Z5 and Z6 are tapering zones where the thickness tapers rearward.

The golf club head 20 is preferably manufactured using a bladder molding process. One such process is described in U.S. Pat. No. 6,248,025, which is hereby incorporated by reference.

Figure 20:
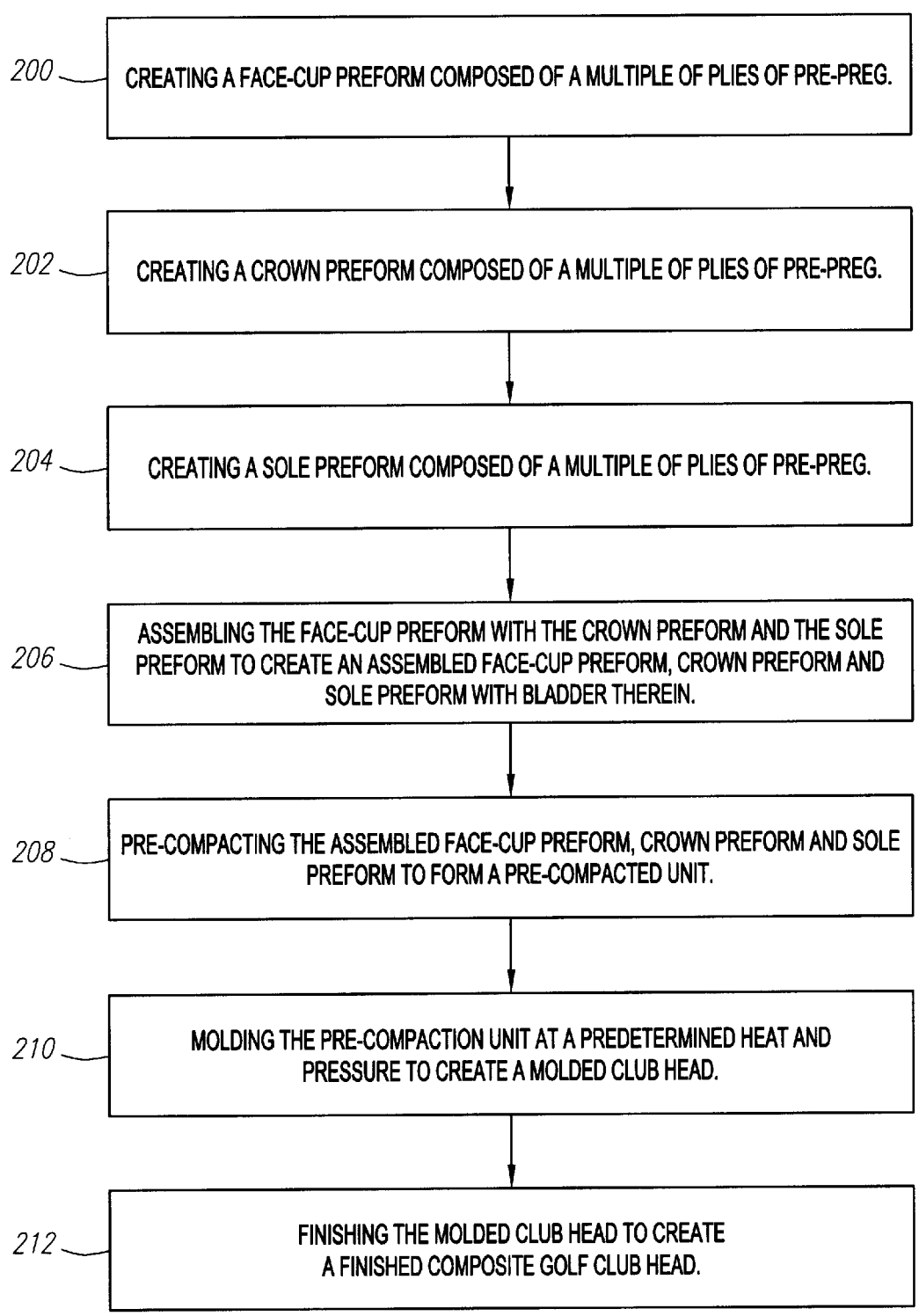
FIG. 20 is a flow chart of the general method of the present invention.

FIG. 20 illustrates the general method of the present invention. At block 200, the face component 125 or face cup preform is created by laying up a plurality of plies of pre-preg sheets. The plies of pre-preg sheets create the striking plate 26 and the return portion 100 of the face component 125. A detailed example of the face component 125 is set forth below. At block 202, the crown component 124 or crown preform is created by laying up a plurality of plies of pre-preg sheets over the face component 125 as shown in FIG. 10. The plies of pre-preg sheets create the crown 24, the striking plate 26 and the return portion 100. A detailed example of the crown component 124 is set forth below. At block 204, the sole component 128 or sole preform is created by laying up a plurality of plies of pre-preg sheets with a plurality of weight members 40a–c. The plies of pre-preg sheets are folded over the plurality of weight members 40a–c. The plies of pre-preg sheets create the ribbon 30 and the bottom portion 28a. A detailed example of the sole component 128 is set forth below.

At block 206, the face cup component 125, crown component 124 and sole component 128 are assembled to form an assembled unit. An inflatable bladder, preferably made from latex, silicone, or similar materials, is placed within the interior of the assembled unit during assembly and an access end of the bladder is placed through the bladder port. At block 208, the assembled unit is placed within a compaction device and pre-compacted to form a pre-compacted unit. At block 210, the pre-compacted unit is placed within a compression mold for bladder molding of the pre-compacted unit into a molded unfinished golf club head. At block 212, the molded golf club head is finished to create the golf club head 20.

During the bladder molding, a source of pressurized gas (not shown) is attached by a gas line to the bladder, and the bladder is inflated within the hollow interior of the pre-compacted unit. The bladder engages the inside surface of the pre-compacted unit, forcing the plies of pre-preg sheets against the inner wall of the compression mold. The mold is then heated at a predetermined temperature for a selected period of time, i.e., a time sufficient to allow proper curing of the resin within the pre-preg sheets. After depressurizing, the bladder is removed through the bladder port 43, and the molded unfinished golf club head is removed from the compression mold. Those skilled in the art will appreciate that, depending upon the type of resin used, curing temperatures may range from 250° F. to 800° F., the requisite curing time may range from a few minutes (for example, in the case of a "quick cure" epoxy or a thermoplastic resin) to 1.5 hours, and the pressure applied via the latex or silicone bladder may range from 100 to 300 psi.

Figure 21:
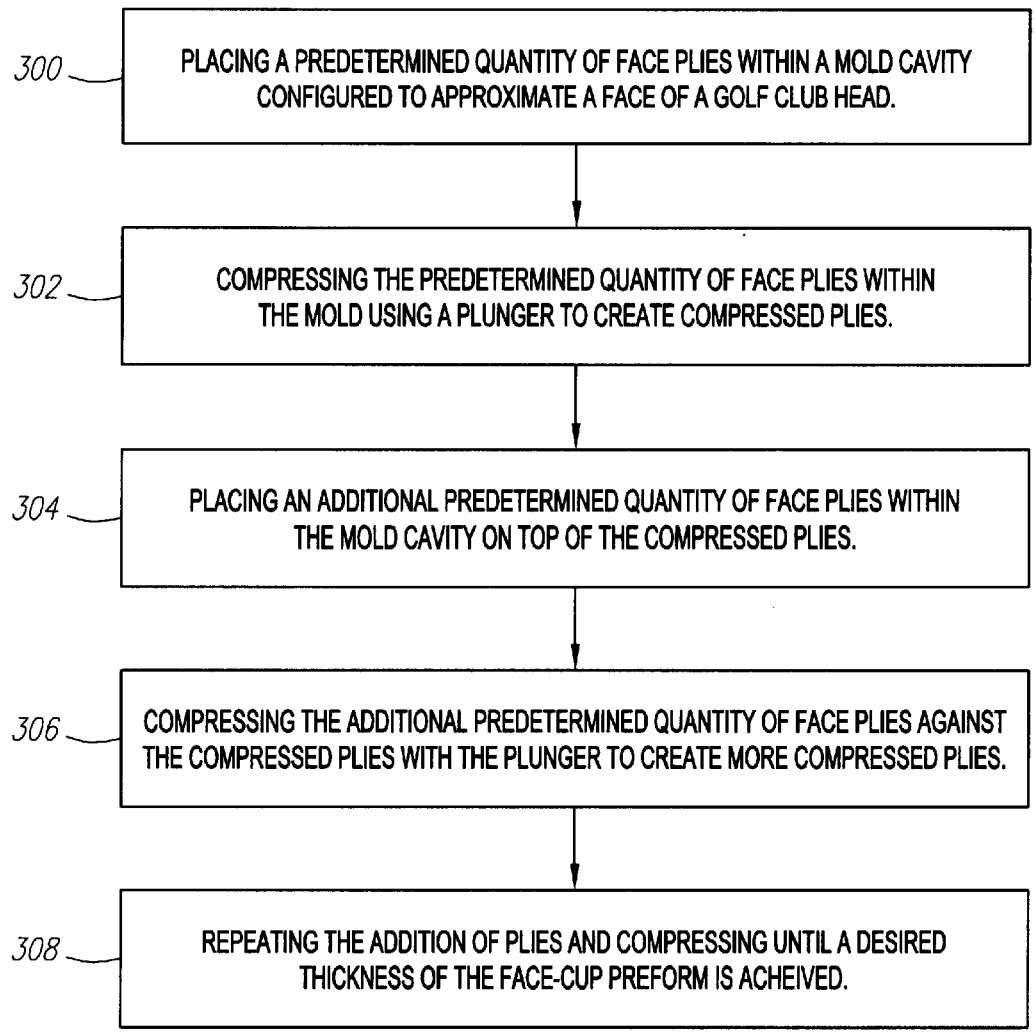
FIG. 21 is a flow chart of the face component creation step of the method of the present invention.

FIG. 21 illustrates the face component creation process of block 200 of FIG. 20. At block 300, a first predetermined quantity of plies of pre-preg sheets for the face component 125 are placed within a cavity configured to approximate the face component 125. At block 302, this first predetermined quantity of plies of pre-preg sheets for the face component 125 are compressed by using a plunger or other similar device to create a stack of compressed plies. At block 304, a second predetermined quantity of plies of pre-preg sheets for the face component 125 are placed within the cavity over the compressed plies. At block 306, this second predetermined quantity of plies of pre-preg sheets for the face component 125 are compressed by using a plunger or other similar device to create a stack of more compressed plies. At block 308, the process is repeated until a desired thickness of the face component 125 is achieved by the process.

This process may be repeated to form both the crown component and the sole component. It would be necessary prior to repeating the steps to exchange the mold cavities so that the appropriate mold cavity is configured to approximate the crown component 124 in forming the crown preform, or to approximate the sole component 128 in forming the sole preform.

Figure 22:
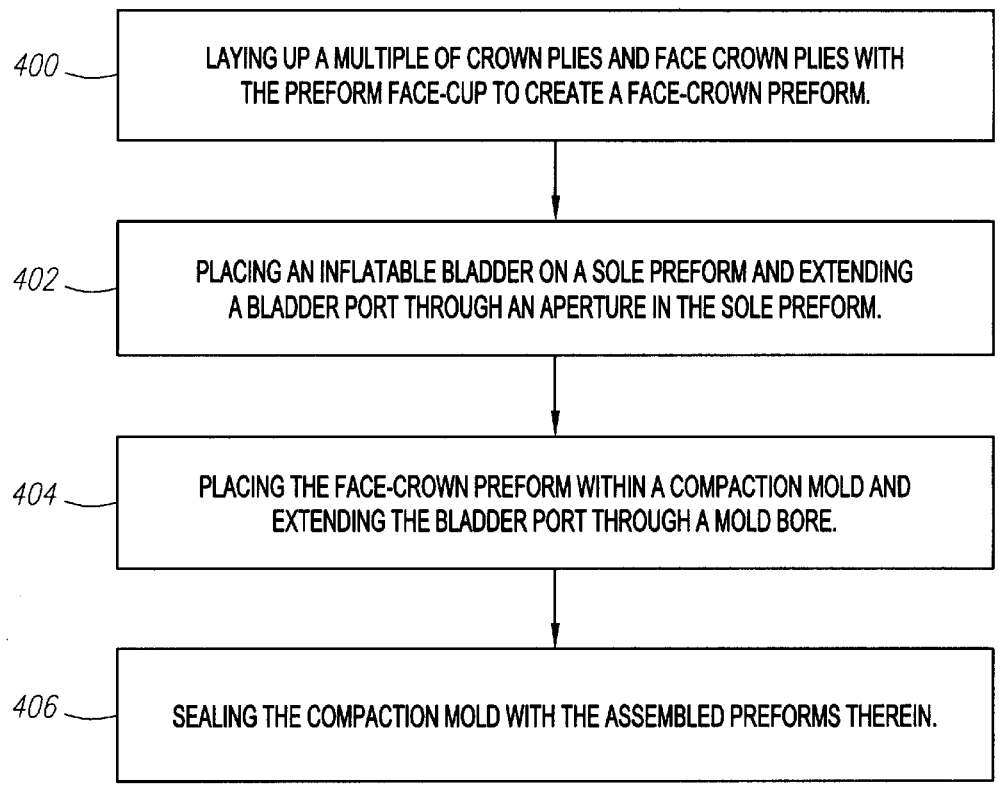
FIG. 22 is a flow chart of the compressing molding step of the method of the present invention.
Figure 23:
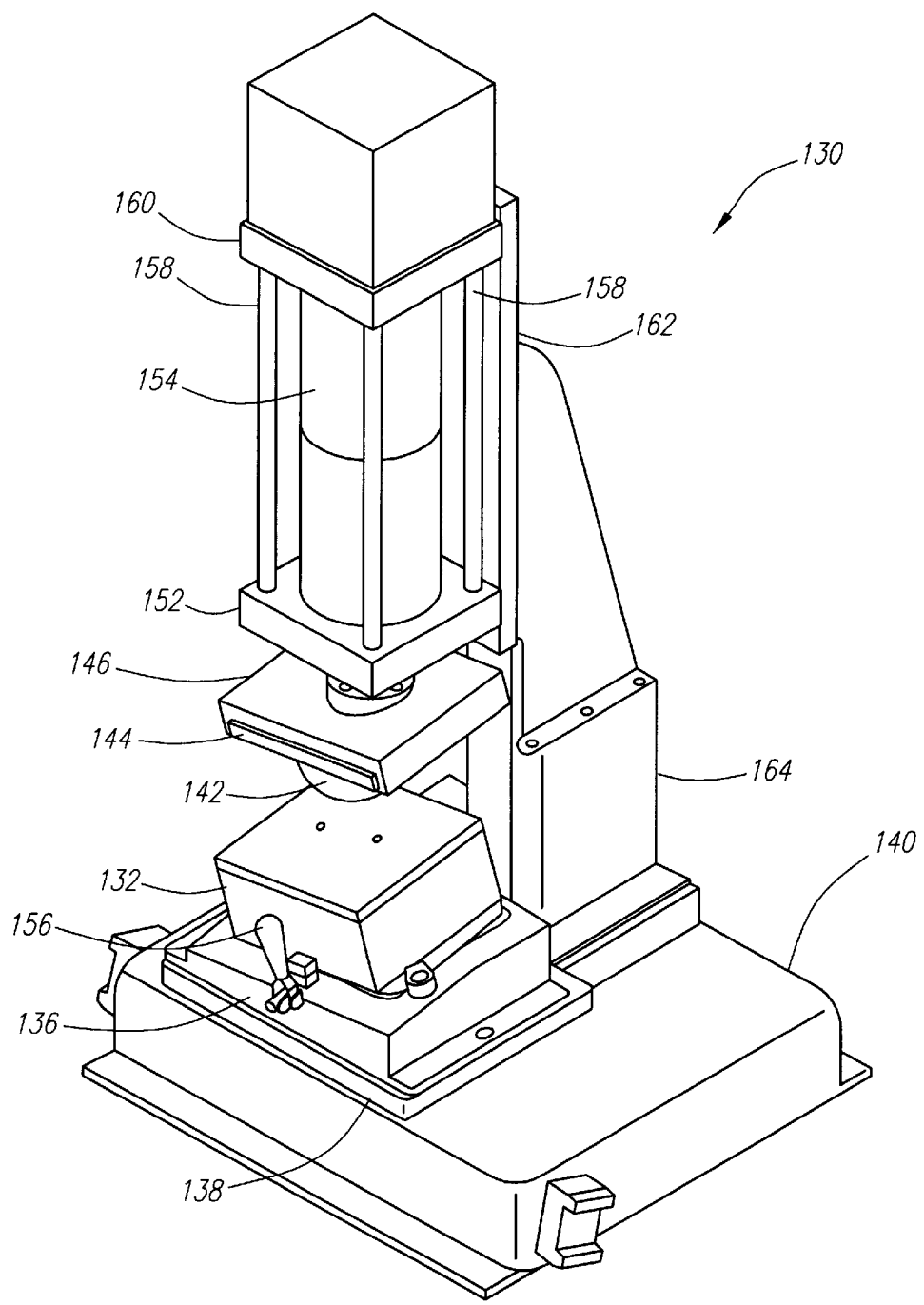
FIG. 23 is a perspective view of the preform manufacturing apparatus.
Figure 24:
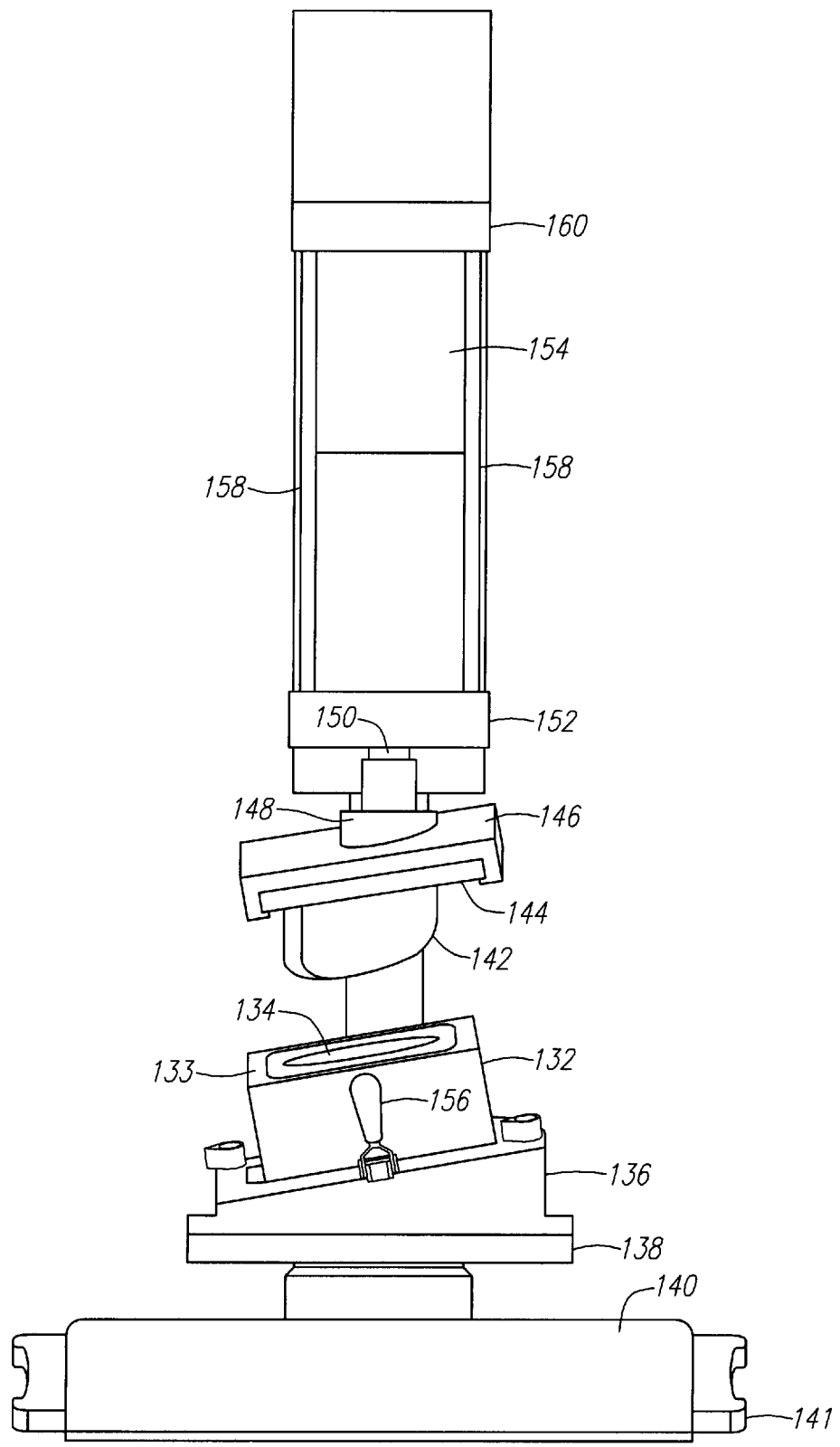
FIG. 24 is a left side view of the preform apparatus.
Figure 25:
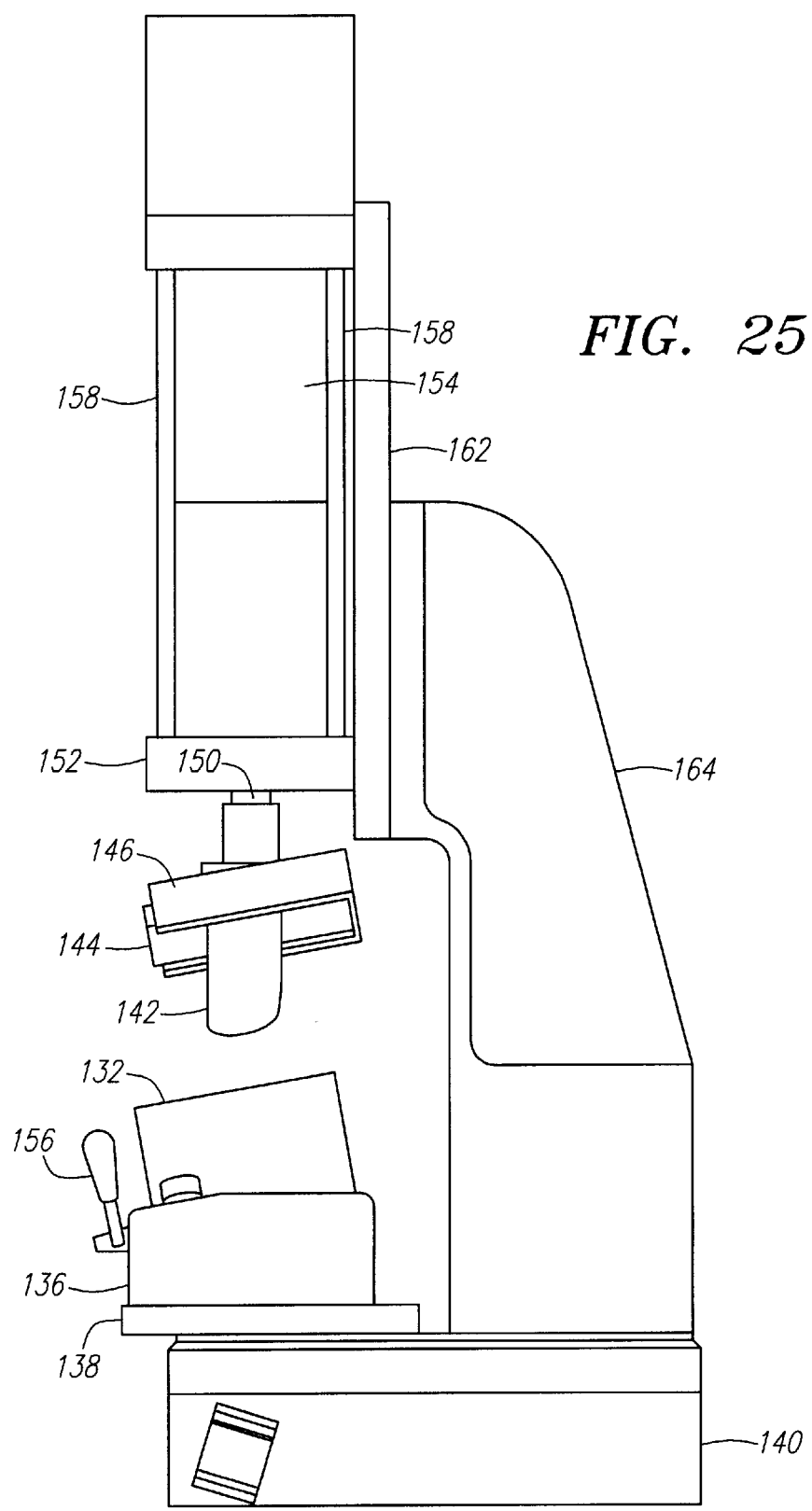
FIG. 25 is a right side view of the preform apparatus.
Figure 26:
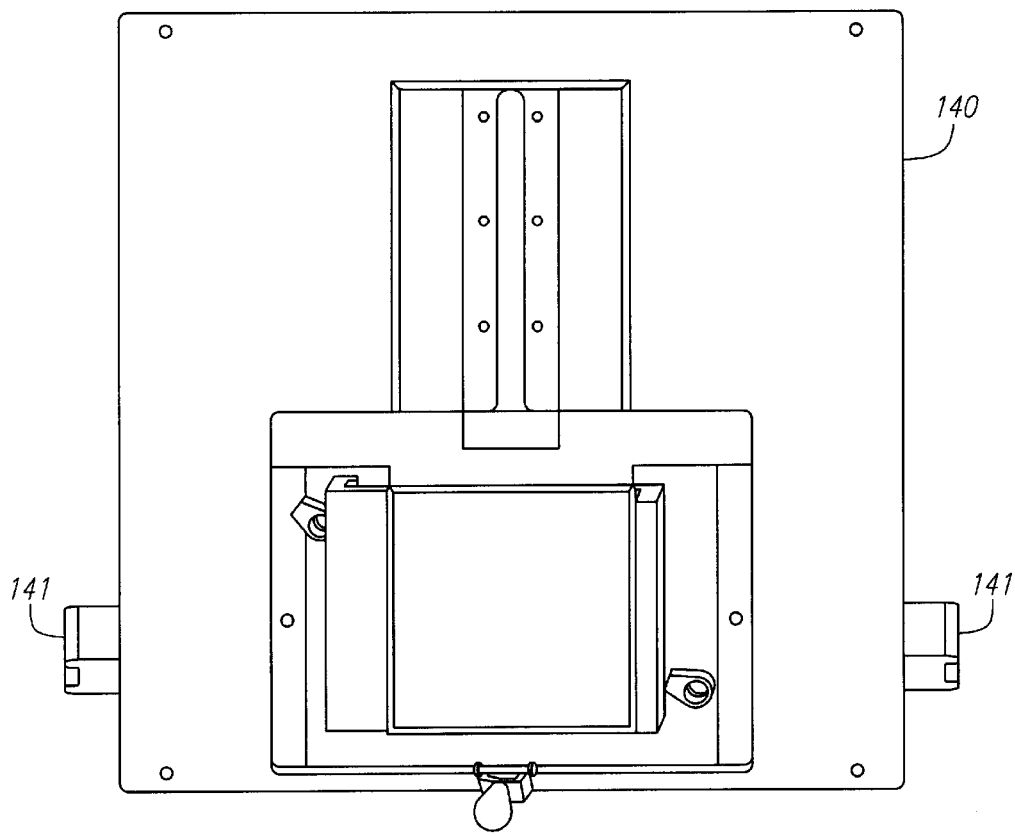
FIG. 26 is a bottom plan view of the preform apparatus.
Figure 27A:
FIGS. 27a–b are schematic views of the plunger head for the face component.
Figure 27B:
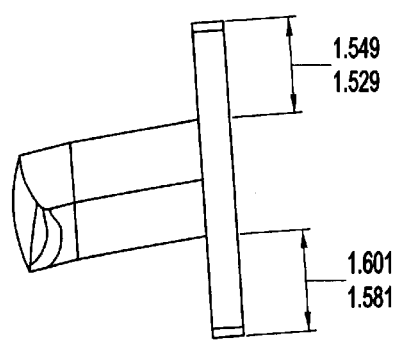
Figure 28A:
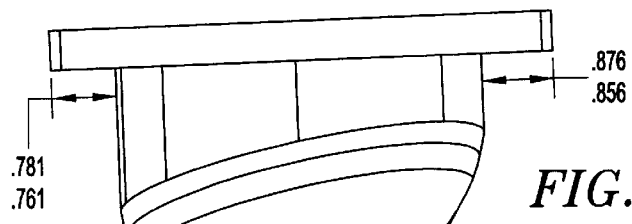
FIGS. 28a–b are schematic views of the plunger head for the sole component.
Figure 28B:
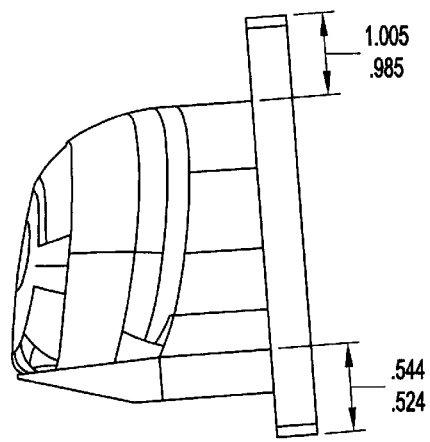
Figure 29A:
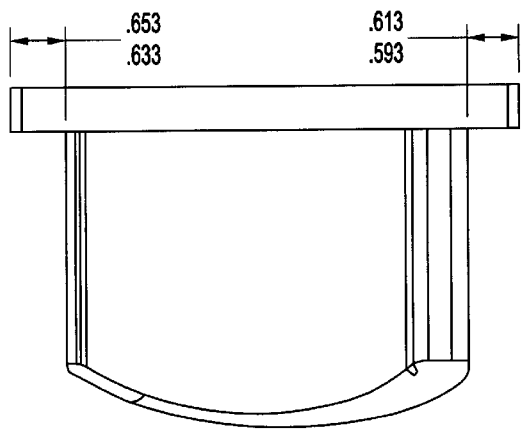
FIGS. 29a–b are schematic views of the plunger head for the crown component.
Figure 29B:
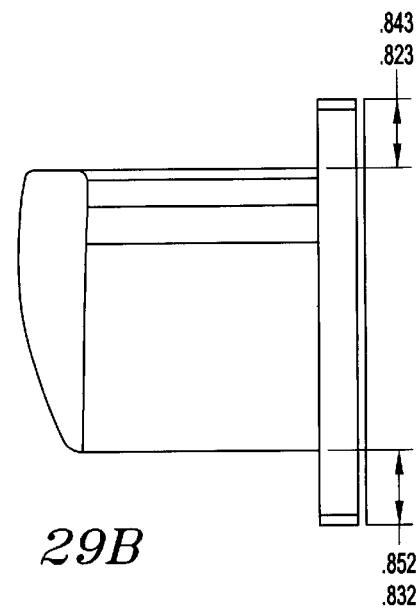

FIG. 22 is a flow chart of the assembly and pre-compaction steps. At block 400, the face-component/crown component is created by laying up the plies of the crown component over the face component 125. At block 402, the inflatable bladder is placed within the sole component 128 and extended through the bladder port 43. At block 404, the assembled unit is placed within a compaction mold, and an extension of the bladder is extended through a bore in the mold. At block 406, the compaction mold is sealed and the assembled unit is compacted to form the pre-compaction unit.

In a preferred embodiment, the face component 125 is composed of forty-eight plies of pre preg sheets: forty full face plies 57 in orientations of zero degrees, plus forty-five degrees, minus forty-five degrees and ninety degrees; and eight face doubler plies 58 in zero degrees and ninety degrees orientations. The crown component 124, which is applied over the face component 125, is composed of seven face/crown plies 55 in orientations of zero degrees, plus forty-five degrees, minus forty-five degrees and ninety degrees. The sole component 128 is composed of seven sole plies 59 in orientations of zero degrees, plus forty-five degrees, minus forty-five degrees and ninety degrees. The second and third pairs of sole plies 59 are folded over the plurality of weight members 40a–c. In a preferred embodiment, the outer plies are a twill pattern for aesthetic purposes and some durability support.

FIGS. 23–26 illustrate an apparatus 130 used in forming the preforms for a golf club head. The apparatus 130 comprises a mold 132 having an opening 133 in the top portion to define a cavity 134. The mold 132 is mounted to the apparatus 130 by a mold support plate 136. The mold support plate 136 is attached to the mold 132 at a top location and to a mold base plate 138 at a bottom location. The mold base plate 138 is held in place by attachment to a base 140 of the apparatus 130. The base 140 of the apparatus 130 may be free standing or may be mounted to a support structure using tabs 141 or other means of attachment.

The mold cavity 134 may be configured to approximate a face cup component 125, crown component 124 or sole component 128 by having an interior surface that conforms to the shape and volume of the component to be molded. A plunger head 142 is mounted on a removable plunger plate 144. The plunger head 142 is comprised of silicone, urethane or other elastomeric materials and preferably has a durometer ranging from 25 to 85 shore A and an elongation range of 100% to 700%. The plunger head 142 and removable plunger plate 144 is located above the cavity 134 and is used to compress the plies of pre-preg sheets into the cavity 134. The plunger head 142 may be of various sizes to approximate the size of the cavity 134 and is designed so that as the size of the plunger head 142 decreases, the corresponding volume of the preform that is created by using the plunger head 142 decreases. The removable plunger plate 144 allows for an assortment of plunger heads 142 to be interchanged to approximate the particular cavity size chosen for manufacturing a preform of the face cup component 125, crown component 124 and sole component 128.

Once the particular preform to be manufactured is chosen, the plunger head 142 is activated to press the plies into the cavity to form the preform. Preferable pressure ranges for the plunger head 142 may range from 30–80 psi, however these ranges may be increased or decreased depending upon variations in the materials chosen to fabricate the preforms. The removable plunger plate 144 with attached plunger head 142 is mounted to a fixed plate 146. The fixed plate 146 is subsequently attached via an attachment piece 148 to a moveable rod 150 located in a bottom portion of a lower support plate 152. The lower support plate 152 is used to support a pnuematic cylinder 154. Thus aligning the pnuematic cylinder 154, plunger head 142, and cavity 134 along a longitudinal axis. The pnuematic cylinder 154 travels up and down in a vertical direction to allow oscillation of the plunger head 142 in and out of the cavity 134 along this longitudinal axis. A release lever 156 is located on the mold support plate 136 and is used to raise the plunger head 142 once the pre-preg plies have been compressed in the cavity 134. The pnuematic cylinder 154 is held in place by a series of support rods 158a–d in conjunction with the lower support plate 152 and an upper support plate 160. A mounting plate 162 is attached to a rear portion of the upper support plate 160 at one end and to the lower support plate 152 at an opposite end. A support arm 164 is used to align the mounting plate 162 in a vertical direction and is attached at one end to the mounting plate 162 and at an opposite end to the apparatus base 140.

FIGS. 27a–b, 28a–b, and 29a–b are schematic views of the plunger head 142 apparatus with respect to the face 125, sole 124 and crown 128 components, respectively. As can be seen from the schematic drawings, the volume of the plunger head 142 increases and decreases with respect to the particular component to be manufactured. Preferable volume ranges for a plunger head 142 used in manufacturing a preform for a small face component 125 may range from 10 in$^3$ to 18 in$^3$, with a more preferable volume of 14.4 in$^3$. Alternatively, for preforms of a large face component 125 the preferable volume range for the plunger head 142 may be from 14.00 in$^3$ to 18.00 in$^3$, with a more preferable volume of 16 in$^3$. For a plunger head 142 used in manufacturing a preform for the sole component 128 a preferable volume range would be 25 in$^3$ to 32 in$^3$, with a more preferable volume of 30.4 in$^3$. Whereas for a plunger head 142 used in manufacturing a preform for the crown component 124 a preferable volume range would be 38 in$^3$ to 45 in$^3$, with a more preferable volume of 41 in$^3$. It should be understood that these are only preferable ranges and that depending upon the size and volume of the club head desired the volumes of the plunger head 142 may be adjusted accordingly.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims.

Therefore, the embodiments of the invention in which an exclusive property or privilege is claimed are defined in the following appended claims.

We claim as our invention:

1. An apparatus for producing preforms for a golf club head, the preforms composed of plies of pre-preg sheets, the apparatus comprising:

a mold support plate attached to a base of the apparatus;

a mold defining a cavity, the mold having a top surface with an opening therein to the cavity, the cavity defining a face cup component, a crown component or a sole component of the golf club head, the mold mounted to a top location of the mold support plate;

a plunger head configured to compress plies of pre-preg sheets placed within the cavity, the plunger head mounted to a removable plunger plate, the plunger head composed of an elastomeric material having a durometer of 25 Shore A to 85 Shore A; and a pneumatic cylinder having a lower support plate, the removable plunger plate attached to the lower support plate of the pneumatic cylinder through a mounting piece at one end, the pneumatic cylinder, plunger head and the mold aligned along a longitudinal axis, the pneumatic cylinder allowing for oscillation of the plunger head and removable plunger plate along the longitudinal axis.

2. The apparatus according to claim 1 wherein the mold defines a cavity configured for a face component for a composite golf club head, and the plunger head is configured to compress plies of pre-preg sheets into the shape of the face component, the face component having a striking plate portion and a return portion.

3. The apparatus according to claim 1 wherein the mold defines a cavity configured for a crown component for a composite golf club head, and the plunger head is configured to compress plies of pre-preg sheets into the shape of the crown component.

4. An apparatus for producing preforms for a golf club head, the preforms composed of plies of pre-preg sheets, the apparatus comprising:

a mold defining a cavity, the mold having a top surface with an opening therein to the cavity, the cavity configured for a sole component for a composite golf club head;

a plunger head configured to compress plies of pre-preg sheets into the shape of the sole component, the plunger head mounted to a removable plunger plate, the plunger head composed of an elastomeric material having a durometer of 25 Shore A to 85 Shore A and a volume ranging from 25 cubic inches to 32 cubic inches; and a pneumatic cylinder having lower support plate, the removable plunger plate attached to the lower support plate of the pneumatic cylinder through a mounting piece at one end, the pneumatic cylinder, plunger head, removable plunger plate and the mold aligned along a longitudinal axis, the pneumatic cylinder allowing for oscillation of the plunger head and removable plunger plate along the longitudinal axis.

* * * * *